(12) United States Patent
Kloster (10) Patent No.: US 6,179,183 B1
(45) Date of Patent: Jan. 30, 2001

(54) PET CARRIER FOR USE WITH BICYCLES

(76) Inventor: John M. Kloster, 255 Cliffside Pl., Rockton, IL (US) 61072

(*) Notice: Under 35 U.S.C. 154(b), the term of this patent shall be extended for 0 days.

(21) Appl. No.: 09/346,216

(22) Filed: Jul. 1, 1999

(51) Int. Cl.[7] .................................................. B62J 11/00
(52) U.S. Cl. ...................... 224/433; 119/496; 119/500; 224/425; 224/428; 224/430; 224/431; 224/445
(58) Field of Search .................. 224/433, 422, 224/425, 428, 430, 431, 445, 440; 119/496, 500, 453; 4/572.1, 290

(56) References Cited

U.S. PATENT DOCUMENTS

| | | | |
|---|---|---|---|
| 4,053,091 | 10/1977 | Martelet | 224/32 A |
| 4,367,829 | 1/1983 | Kusz | 224/31 |
| 4,896,630 | 1/1990 | Luce | 119/96 |
| 5,361,430 | * 11/1994 | Wise | 4/572.1 |
| 5,479,892 | 1/1996 | Edwards | 119/771 |
| 5,575,443 | 11/1996 | Honeycutt | 248/231.9 |
| 5,577,646 | 11/1996 | White | 224/422 |
| 5,810,227 | 9/1998 | Jorgensen | 224/413 |
| 5,832,874 | 11/1998 | Ravin | 119/496 |

FOREIGN PATENT DOCUMENTS

2053673 * 2/1981 (GB) ........................... 4/572.1

* cited by examiner

Primary Examiner—Stephen K. Cronln
Assistant Examiner—Maerena W. Brevard
(74) Attorney, Agent, or Firm—Leydig, Voit & Mayer, Ltd.

(57) ABSTRACT

A pet carrier for use with bicycles particularly configured to allow installation at a forward position of a bicycle is presented. The particular configuration of the bottom surface of the pet carrier allows the carrier to be mounted in a forward position on a bicycle without interfering in the steering, braking, or gear shifting operations of the handlebars. Specifically, the pet carrier provides a plateaued or two-tiered surface that positions the carrier up and over the handlebars without interfering therewith. A lower bottom surface accommodates a pet's hindquarters, while the upper tiered surface accommodates the pet's forequarters. These two-tiered surfaces are separated by a sloped surface onto which the pet may rest during a bicycle ride. The carrier advantageously includes ventilation apertures or forward facing louvers to provide additional comfort to the pet. An additional aspect of the instant invention includes a mounting adapter which accommodates the mounting of the pet carrier on a man's or a woman's bicycle. A further embodiment accommodates a rear, over wheel mounting position for the pet carrier.

16 Claims, 10 Drawing Sheets

PET CARRIER FOR USE WITH BICYCLES

FIELD OF THE INVENTION

The instant invention relates to pet carriers, and more specifically to a pet carrier for use in transporting pets or other small animals on a bicycle.

BACKGROUND OF THE INVENTION

Pets play an extremely therapeutic role in the lives of many, providing companionship and relieving stress from an otherwise hectic day. The integration of the family pet into the owner's daily activities, as well as into society as a whole, has increased significantly in recent years. Recognizing the desire of many pet owners to include their pets in their daily routines, many stores now provide access to both owners and their pets, and there are even restaurants, which will provide a gourmet meal for an owner and his or her pet.

In addition to the increased access provided to owners and their pets, an entire industry is devoted to providing products to accommodate the safe transportation of pets so that they may always be with their owner. Products ranging from hand held carriers, to car safety seats (U.S. Pat. No. 5,479,892 for VEHICLE SAFETY SEAT FOR PETS awarded to Edwards on Jan. 2, 1996), to car seat belts for pets (U.S. Pat. No. 4,896,630 for ANIMAL SAFETY SEAT BELT awarded to Luce on Jan. 30, 1990), to various types of pet carriers for bicycles and motorcycles (U.S. Pat. No. 5,577,646 for PET CARRIER FOR BICYCLE awarded to White on Nov. 26, 1996; U.S. Pat. No. 5,810,227 for MOTORCYLE MOUNTED DOG CARRIER awarded to Jorgensen on Sep. 22, 1998; and U.S. Pat. No. 5,832,874 for PET CARRIER awarded to Ravin on Nov. 10, 1998).

While a majority of these products are directed to the cat and small dog segments of the pet population, many of these pets can become nervous and easily agitated when exposed to new environments, strange people, and other animals. This problem is particularly apparent when a pet is taken on a bicycle ride with his owner. Unfortunately, since the pet carriers currently available are all mounted behind the owner over the back wheel of the bicycle, the owner is unable to soothe his or her pet when it becomes agitated during a bicycle ride. Further, while the owner is able to transport the pet on the bicycle ride, the owner receives very little beneficial feedback from the pet since the pet is out of his view and touch while riding. Additionally, and most distressing, is the realization that, with a rear wheel mounted pet carrier, the owner may not be aware if his or her pet falls, jumps, or otherwise gets out of the pet carrier for quite some time until the owner has the opportunity to again turn around and check on the status of the pet.

In addition to the safety and companionship issues discussed above, the current state of the art in bicycle mounted pet carriers also provides limited comfort for the pet. Typically, most bicycle mounted pet carriers provide a flat bottom with raised walls into which the pet is placed for the bicycle ride. Unfortunately, this design requires that the pet remain in a sitting position with weight on the pet's front paws. In an attempt to alleviate the pressure on the front paws, the pet in a rear wheel mounted bicycle carrier may lean on the back of the owner with his head or front paws. This not only presents an uncomfortable position for the rider with the additional weight and heat from the pet pressing on the rider's back, but also raises certain safety concerns if a quick evasive move is required by the rider. Additionally, the pet's position directly behind the rider's back provides a drafting effect for the pet which significantly reduces the amount of air which blows across the pet to keep the pet cool and comfortable. While many pet carriers for bicycles include ventilation holes in the carrier itself, these holes cannot make up for the reduced air flow resulting from the drafting effect of being placed so close behind the rider's back.

As a result of these and other problems existing in the art, the pleasure which may have been derived from bringing an owner's companion along for a ride has been greatly diminished. Further, the comfort and safety of both the pet and the owner has also been reduced. Therefore, the need exists for a pet carrier for a bicycle which overcomes these and other known problems existing in the art.

SUMMARY OF THE INVENTION

In view of the above, it is an object of the instant invention to provide a new and useful pet carrier for bicycles which overcomes the above and other known problems existing in the art. Specifically, it is an object of the instant invention to provide a pet carrier for a bicycle, which allows for continuous owner access to the pet during the bicycle ride. It is a further object of the instant invention to provide a new and improved pet carrier, which increases the comfort level of the pet while riding therein. Additionally, it is an object of the instant invention to provide a pet carrier that increases the amount of cooling air supplied to the pet during the ride. It is a further object of the instant invention to provide a pet carrier which may mount on either a man's or a woman's bicycle.

In view of these objects, it is a feature of the instant invention that the carrier may be mounted in front of the rider on the bicycle. It is a further feature of the instant invention to provide a plateaued bottom surface to accommodate the comfort of the pet during extended bicycle rides. Additionally, it is a feature of the instant invention to provide increased ventilation to the pet to maintain its comfort during hot days.

In view of the above objects and features of the invention, it is an aspect of the instant invention to provide a unitary molded plastic assembly which securely mounts to the center bar of a bicycle in front of the rider. It is a further aspect of the instant invention that the plateaued bottom surface providing additional comfort for the pet extend up and over the handle bars in a manner which does not interfere with the safe operation and control of the bicycle. It is a further aspect of the instant invention to provide a mounting adapter which accommodates male or female configured bicycles to maintain the pet carrier bottom surface in a comfortable and safe approximately horizontal position for the pet. It is an additional aspect of the instant invention to provide drainage from the bottom of the lower tier of the pet carrier of the instant invention to eliminate the accumulation of moisture.

In a preferred embodiment of the instant invention, a pet carrier for use on a bicycle comprises a structure having a plateaued bottom surface and vertical front, side, and rear walls. The plateaued bottom surface defines a raised forward resting surface, an intermediate sloped surface, and a lower rearward support surface. Preferably, the support surface defines at least one drainage hole therein, and the side walls define air passages therethrough. In a highly preferred embodiment, the air passages are configured to form forward embossed louvers. For the pet's comfort, a preferred embodiment includes the front wall defining a reduced height region therein to accommodate a pet's head. Further, the side and rear walls are profiled to maintain an essentially constant height from the plateaued bottom.

In a preferred embodiment, the pet carrier further comprises a mounting adapter operably coupled to the support surface and configured to mount on a center bar of a bicycle. The support surface includes a mounting flange on an exterior thereof, and is removably attached thereto to provide the operable coupling. Alternatively, the mounting adapter includes a bracket portion, and a base portion having a lower surface and an upper mounting surface. The base portion defines a mounting groove in a lower surface which is adapted to accommodate a center bar of a bicycle, and which is positioned in a spaced parallel relationship to the upper mounting surface. The bracket portion is preferably operably coupled to the lower surface to securely attach the mounting adapter to the center bar of a man's bicycle.

In an alternate preferred embodiment, the mounting groove is positioned in a spaced angled relationship to the upper mounting surface, and the bracket portion is operably coupled to the lower surface to securely attach the mounting adapter to the center bar of a woman's bicycle. In a further alternate embodiment, the mounting adapter includes an adjustable base portion having a lower portion defining a lower surface and an upper portion pivotably attached to the lower portion at a forward position and defining an upper mounting surface. The lower portion is adapted to accommodate a center bar of a bicycle with the mounting groove positioned in a spaced, adjustable angle relationship to the upper mounting surface to securely attach the mounting adapter to the center bar of a man's or a woman's bicycle. This is accomplished by the upper portion being adjustable to provide the upper mounting surface at an essentially horizontal position regardless of an angular relationship of the center bar of the bicycle.

In a further embodiment of the pet carrier of the instant invention, a mounting adapter is included which operably couples to the support surface and is configured to mount to a rear wheel axle and frame of the bicycle to position the pet carrier behind a rider.

An alternate preferred embodiment of the instant invention presents a pet carrier for use on a bicycle having a seat, handlebars, and a center bar provided between the seat and the handlebars. This embodiment comprises a structure having a plateaued bottom surface defining a raised forward resting surface, an intermediate sloped surface, and a lower rearward support surface. A mounting adapter is operably coupled to the lower rearward support surface, and is adapted to securely mount on the center bar of the bicycle forward of the seat. Preferably, the plateaued bottom surface is adapted to position the forward resting surface vertically above the handlebars without interference when mounted by the mounting adapter on the center bar of the bicycle, forward of the seat.

The structure further comprises essentially vertical front, side, and rear walls, the front wall defining a reduced height portion adapted to accommodate a pet's head. This reduced height portion also includes a chin pad on an upper surface for the pet's added comfort. The side walls preferably define forward embossed louvers. A preferred embodiment of the mounting adapter includes a bracket portion and an adjustable base portion. This base portion has a lower portion defining a lower surface and an upper portion pivotably attached to the lower portion at a forward position defining an upper mounting surface. This lower portion defines a mounting groove in its lower surface which is adapted to accommodate a center bar of a bicycle. The mounting groove is positioned in a spaced, adjustable angle relationship to the upper mounting surface. The bracket portion is operably coupled to the lower surface to securely attach the mounting adapter to the center bar of the bicycle, and the upper portion is adjustable to provide the upper mounting surface at an essentially horizontal position regardless of an angular relationship of the center bar of the bicycle.

In a highly preferred embodiment of the instant invention, a pet carrier comprises a bicycle having a seat, handlebars, and a center bar provided between the seat and the handlebars, and a pet containment structure having a plateaued bottom surface. This plateaued surface defines a lower rearward support surface mounted to the center bar forward of the seat, a forward projecting intermediate upwardly sloped surface joined to the rearward support surface, and a raised forward resting surface joined to the intermediate upwardly sloped surface and positioned vertically above the handlebars in a non-interfering relationship.

Preferably, the pet carrier further comprises a mounting adapter interposed between and operably coupled to the lower rearward support surface and the center bar. The mounting adapter is adapted to securely mount on the center bar of the bicycle forward of the seat to provide an essentially horizontal positioning of the lower rearward support surface. The mounting adapter includes a bracket portion, and an adjustable base portion having a lower portion defining a lower surface and an upper portion pivotably attached to the lower portion at a forward position and defining an upper mounting surface. The lower portion defines a mounting groove in the lower surface which is adapted to accommodate the center bar. This mounting groove is positioned in a spaced, adjustable-angle relationship to the upper mounting surface. The bracket portion is operably coupled to the lower surface to securely attach the mounting adapter to the center bar, and the upper portion is adjustable to provide the upper mounting surface at an essentially horizontal position for center bar configurations of both men's and women's bicycles.

Other object and advantages of the invention will become more apparent from the following detailed description when taken in conjunction with the accompanying drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE PREFERRED EMBODIMENTS

Figure 1:
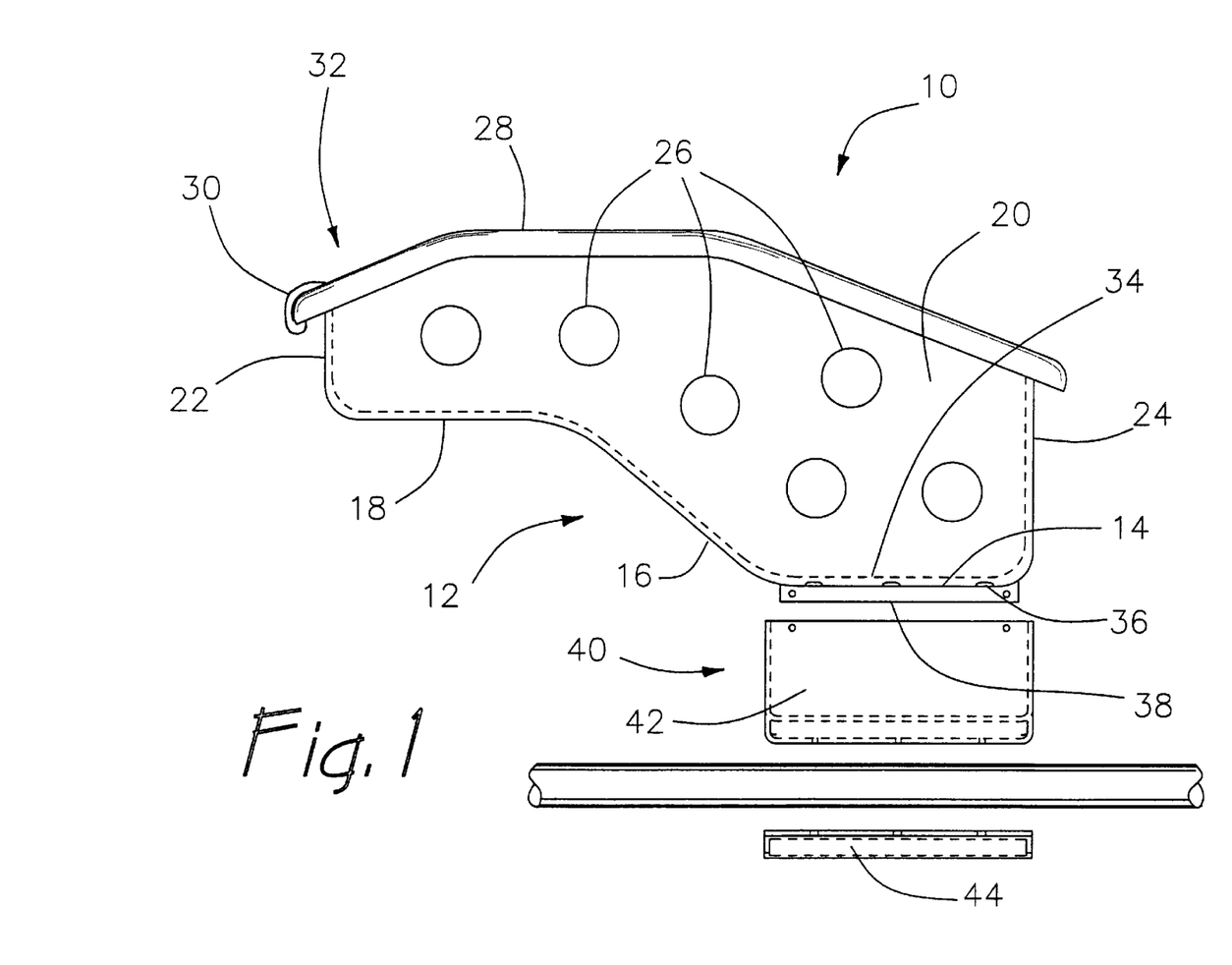
FIG. 1 illustrates an embodiment of the pet carrier of the instant invention.

As discussed above, prior bicycle mounted pet carriers suffer from various shortcomings, which prohibit the full enjoyment of the shared experience between owner and pet of taking a simple bicycle ride. These shortcomings are overcome, and additional advantages presented by a preferred embodiment of the pet carrier of the instant invention 10 as illustrated in FIG. 1, to which specific reference is now made. As may be seen from this side view illustration, the pet carrier 10 includes a plateaued bottom 12 which has a lower seating area 14, an angled transition surface 16, and an upper resting surface 18. This plateaued bottom surface 12 allows a pet to rest comfortably while on a bicycle ride by alleviating the necessity of maintaining a sitting position with weight applied to the front paws of the pet, as was required by prior bicycle mounted pet carriers.

The particular angle at which surface 16 is sloped is preferably within the range of 130° to 135° as measured from the lower support surface 14, although the selection of any particular angle is not of particular significance to the invention. However, as the angle increases beyond 90° (as measured from the lower support surface 14), additional weight will be shifted from the pet's hindquarters to the pet's chest and front paws. As the angle of slope approaches 180° as measured from the lower support surface 14, the forward resting surface 18 nears the same approximately horizontal position as surface 14, and much of the advantage provided by the instant invention is lost. Of importance, therefore, the upper resting surface 18 preferably defines an upper approximately horizontal plane which is coupled to the lower approximately horizontal plane of the support surface 14 by a sloping surface 16, providing a two tiered bottom 12.

The pet carrier 10 of the instant invention also includes vertical side 20, front 22, and rear 24 walls which define an interior cavity into which the pet is placed. At least the side walls preferably define a plurality of air ventilation openings 26 which may be in the form of holes, slits, etc. formed in the side wall material. These ventilation openings 26 allow increased airflow in and through the cavity into which the pet will be placed to therefore cool the pet during operation. The top surface 28 of the walls 20, 22, 24 preferably provide a rounded surface for safety and comfort of use. Additionally, in a highly preferred embodiment, the top surface 28 of the forward wall 22 includes a chin pad 30 to provide added cushion and comfort for the pet in the event the pet chooses to rest his or her chin on the top of forward wall 22. To accommodate this, the front wall 22 is shorter than the side wall 20 in this forward location 32 of the pet carrier 10 to allow the pet's nose and head to protrude forward of the front wall 22.

In addition to the comfort aiding chin pad 30, a preferred embodiment of the instant invention also includes a pad 34 on which the pet may rest. This pad 34 may be placed on the bottom support surface 14, the sloped surface 16, the upper resting surface 18, or on a combination of any of these surfaces. Additionally, a preferred embodiment of the instant invention includes at least one drainage hole 36 in the bottom support surface 14 for drainage of liquid should it rain or the pet have an accident.

A preferred embodiment of the pet carrier of the instant invention 10 also includes a mounting flange 38. This mounting flange 38 allows the pet carrier 10 to be removably mounted on a mounting adapter 40. This mounting adapter 40 contains a base portion 42 and a bracket portion 44 as will be described in greater detail below with regard to FIGS. 4–6. Suffice it to say at this point that the mounting adapter 40 allows for the securing of the pet carrier 10 to the center bar of a bicycle, forward of the rider's sitting position.

Figure 2:
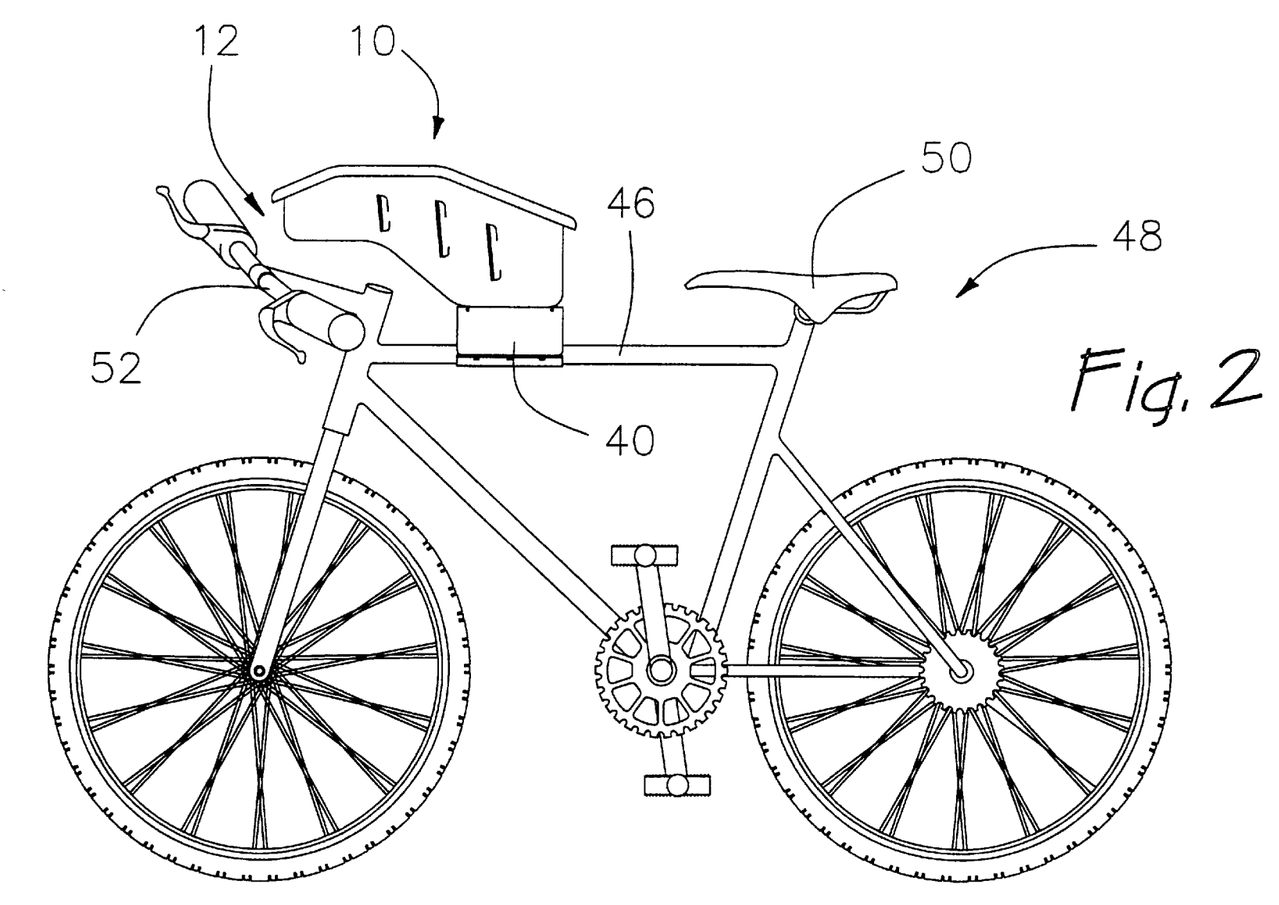
FIG. 2 illustrates a preferred installation of an embodiment of the pet carrier of the instant invention on a bicycle.

In its preferred installation, as illustrated in FIG. 2, the pet carrier of the instant invention 10 is mounted by mounting adapter 40 onto the center bar 46 of a standard bicycle 48, forward of the rider's normal sitting position on seat 50. As may be seen from this installation illustration, the plateaued bottom surface 12 of the pet carrier 10 accommodates the handle bars 52 of the bicycle 48 without interfering in either the vision, steering, braking, or gear shifting provided thereby. The approximately horizontal positioning of the pet carrier 10 on the center bar 46 is dependent on the mounting bracket and the angle of the center bar. While many men's bikes include a center bar which angles downwardly from the handlebars at an angle of approximately 10°–12°, this depends on the particular make and model of the bicycle. Therefore, the pet carrier may not be horizontal, but may be essentially or approximately horizontal. The limiting factors on the acceptable angles from horizontal are the pet's comfort and safety, as well as the lack of interference with the rider's ability to safely control the bicycle.

Figure 3:
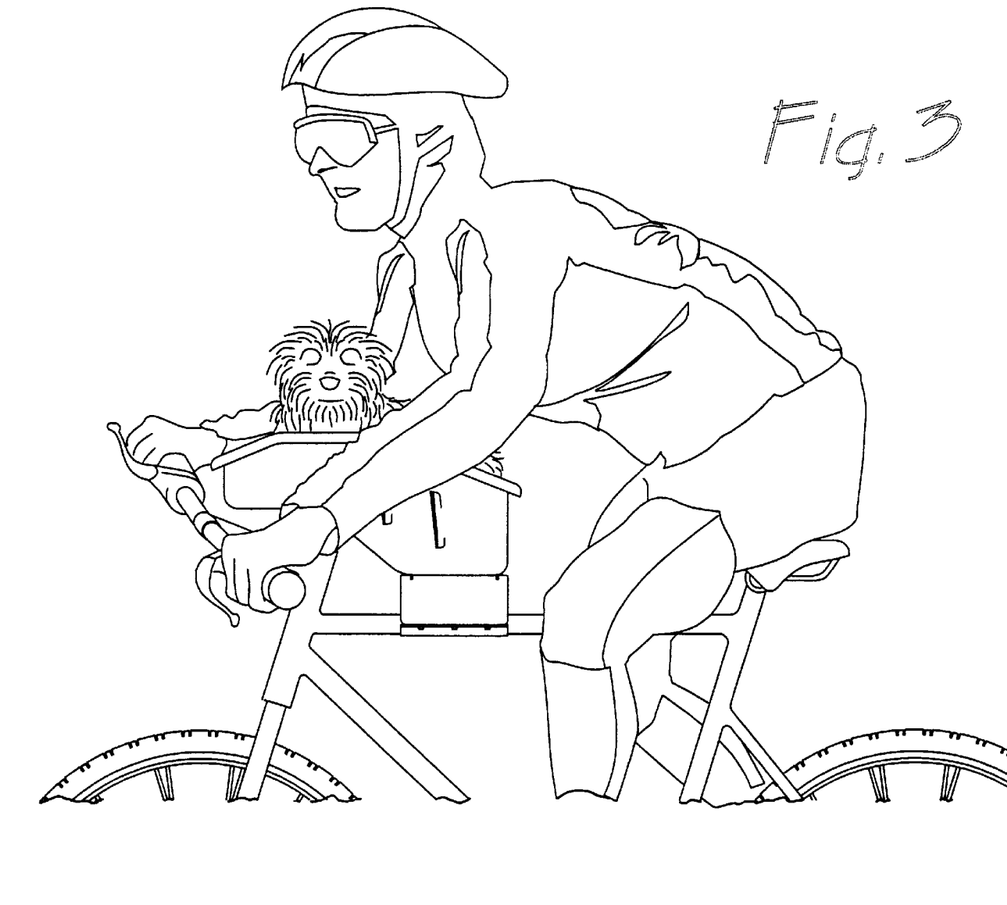
FIG. 3 illustrates the functional inter-relationship between a rider and a pet provided by the installation illustrated in FIG. 2.

This forward mounting position allows a rider and pet to interact freely, while not interfering with the rider's vision pedaling, steering, braking, or gear shifting as illustrated in FIG. 3. In this forward installed position, the pet carrier 10 is prevented from spinning by the mounting adapter 40 which provides a tight clamp on the center bar. This friction fit may be further aided through the incorporation of a rubber gasket in the mounting adapter 40 as desired.

Figure 4A:
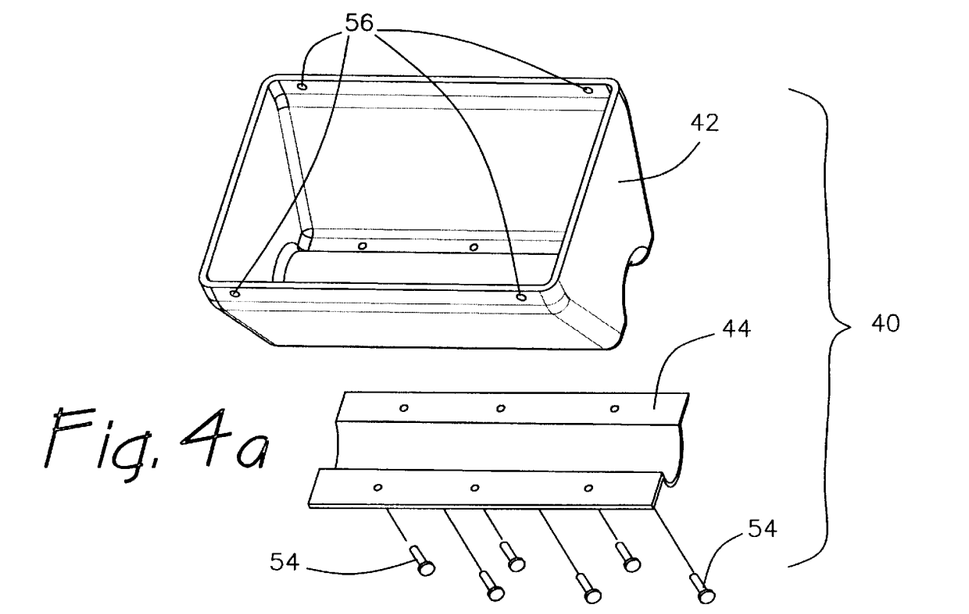
FIG. 4a provides an exploded view of an aspect of the instant invention adapted to mount the pet carrier of the instant invention on a man's bicycle.
Figure 4B:
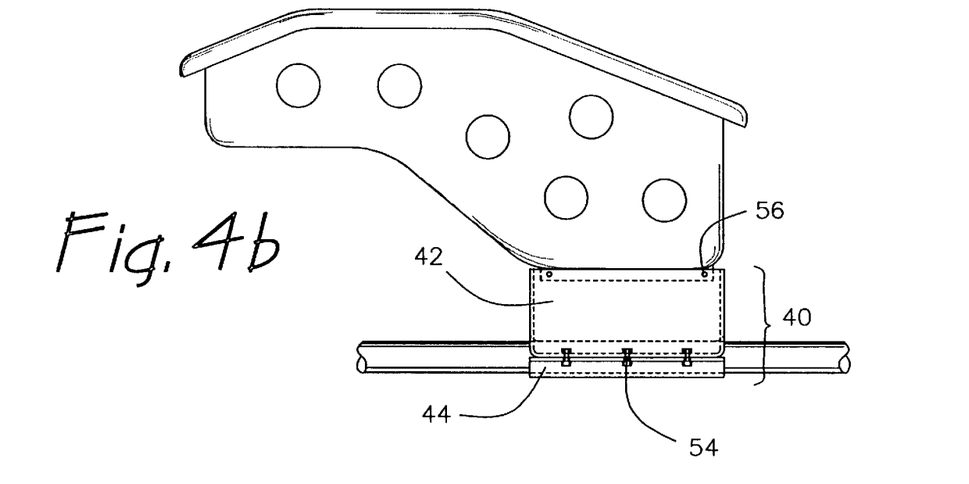
FIG. 4b illustrates the aspect of FIG. 4a as installed on a man's bicycle with the pet carrier of the instant invention.

Details of a mounting adapter suitable for use with the pet carrier 10 of the instant invention is illustrated in exploded view in FIG. 4. As may be seen, a suitable embodiment of a mounting adapter includes a base portion 42 and a bracket portion 44 which may be secured to the bottom of the base 42 via suitable fasteners such as bolts or screws 54. The base portion 42 also preferably includes mounting holes 56 which may be removably attached to the mounting flange 38 (see FIG. 1) of the pet carrier 10. The height of the base portion 42 obviously affects the overall position of the pet carrier 10 above the center bar and handle bars. Therefore, the height of this base 42 may be adjusted to provide adequate clearance of the handlebars 52 under the plateaued bottom 12 as appropriate for a particular rider. Taller riders who require their handlebars to be in a higher position may utilize a tall base 42 to allow for proper positioning of the pet carrier 10 over the handlebars 52. Likewise, shorter riders may utilize a base 42 which is relatively short, allowing the installed position of the pet carrier 10 to be lowered out of the rider's way and onto the center bar 46 of the bicycle. Additionally, this mounting base 42 may be integrally formed or fixably attached to the pet carrier 10 as desired, although such dispenses with the advantage of the adjustability of height provided by the separate base 42.

Figure 5A:
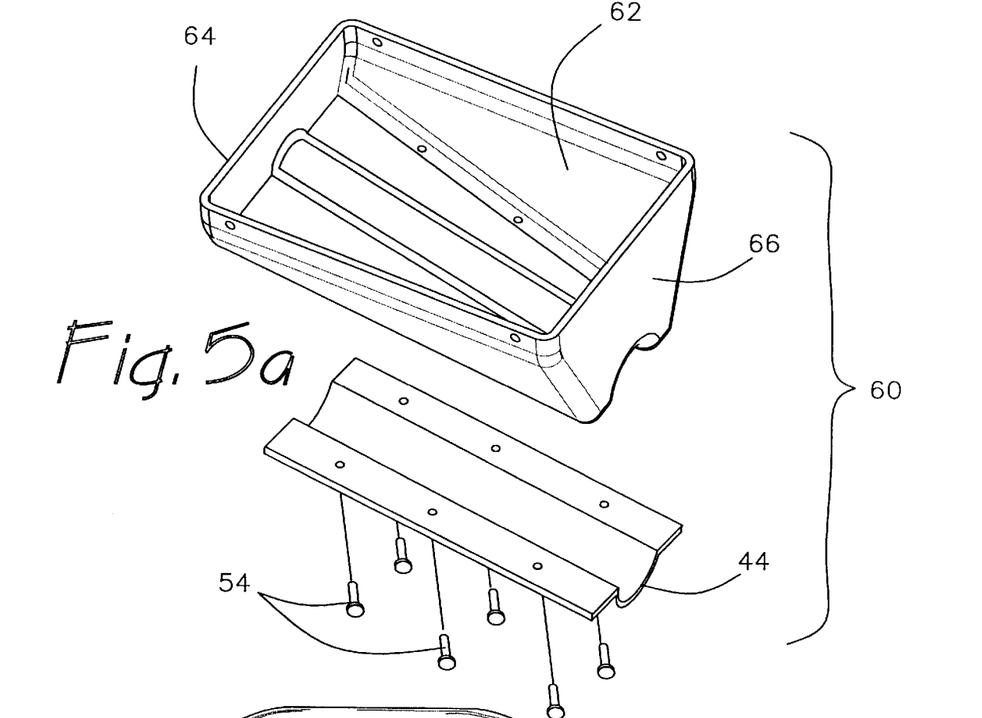
FIG. 5a provides an exploded view of an aspect of the instant invention adapted to mount the pet carrier of the instant invention on a woman's bicycle.
Figure 5B:
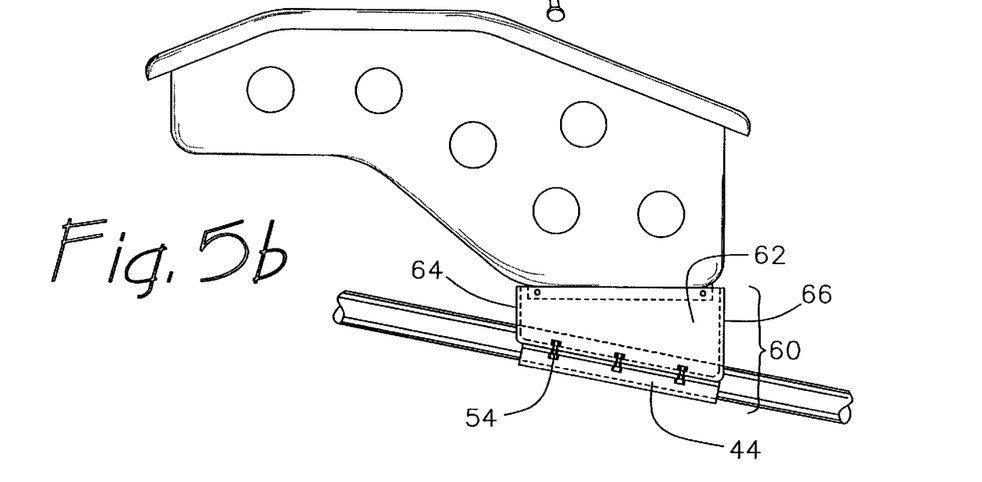
FIG. 5b illustrates the aspect of FIG. 5a as installed on a woman's bicycle with the pet carrier of the instant invention.

While the above discussions have utilized illustrations of and installations on a man's bicycle having a nearly horizontal center bar, the pet carrier 10 of the instant invention finds equal application to a woman's bicycle having a downwardly sloping bar (typically between 28°–30°) by utilizing a mounting adapter 60 as illustrated in FIG. 5. As may be seen, this mounting adapter 60 may utilize the same bracket portion 44 as used in the man's bike bracket 40, but includes an angled mounting base 62 which provides the proper approximately horizontal positioning of the bottom resting surface 14 (see FIG. 1) while compensating for the larger angle of the bar on the woman's bike. This compensation is accommodated for by the different length forward 64 and rearward 66 end surfaces. As with the man's bike mounting adapter 40, the woman's bike mounting adapter 60 also may compensate for different height riders by providing taller or shorter height bases 62.

Figure 6A:
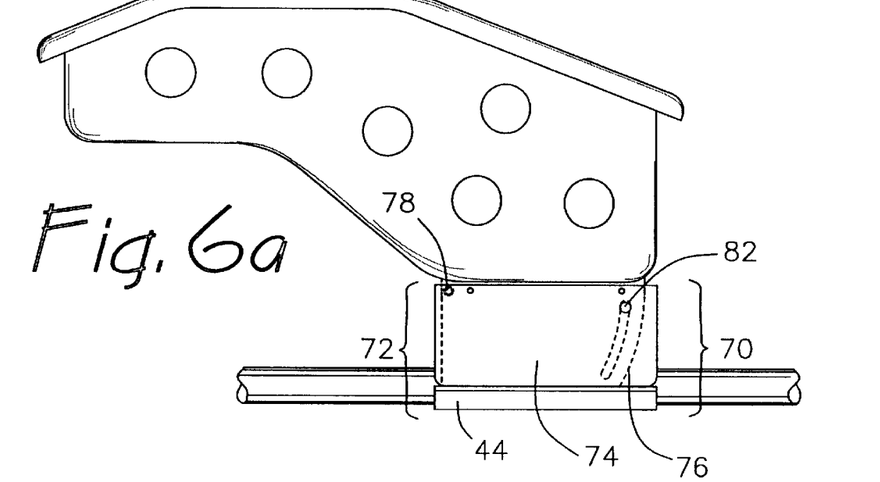
FIG. 6a illustrates a further aspect of the instant invention particularly adapted for mounting the pet carrier of the instant invention on either a man's or woman's bicycle as mounted on a man's bicycle.
Figure 6B:
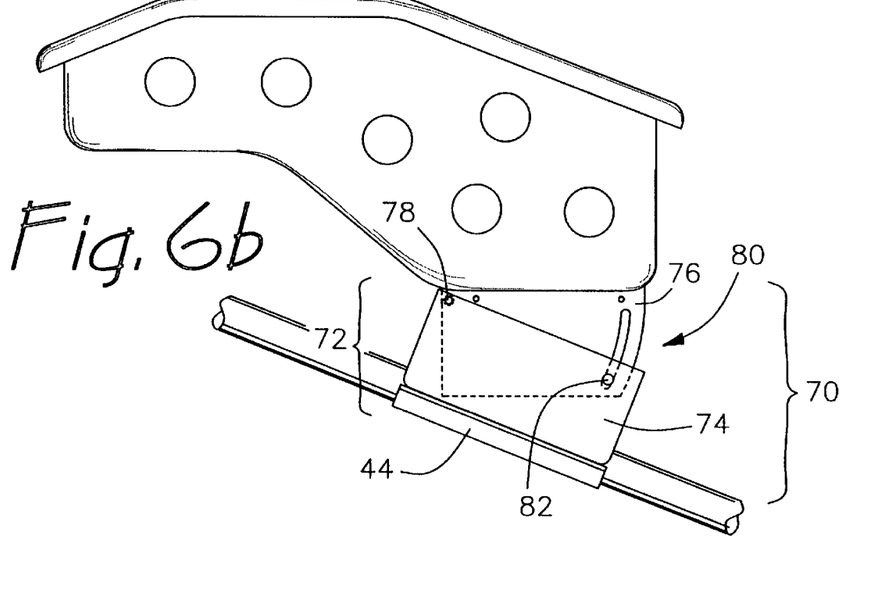
FIG. 6b illustrates the further aspect of the instant invention particularly adapted for mounting the pet carrier of the instant invention on either a man's or woman's bicycle as illustrated in FIG. 6a, as mounted on a woman's bicycle.

To obviate the necessity of having different mounting bases 42, 62 to accommodate both men's and women's bicycles, a mounting adapter 70 as illustrated in FIG. 6 may be utilized. This mounting adapter 70 provides an adjustable base 72 which can compensate for the downward sloping bar on a woman's bike as well as for the approximately horizontal bar of a man's bike. This compensation may be performed by a two-piece base construction having a bracket mounting portion 74 and a mounting flange mating portion 76. These two sections 74, 76 are pivotally mounted at a forward portion 78 of the two portions to allow the rearward portion 80 to move relative to one another. Preferably, these two elements 74, 76 may be held in any relative position providing for compensation for bars of any angle by simply tightening a bolt or screw 82. As with the other mounting adapters 40, 60, this mounting adapter may also compensate for the height of the riders in similar fashion.

Figure 7:
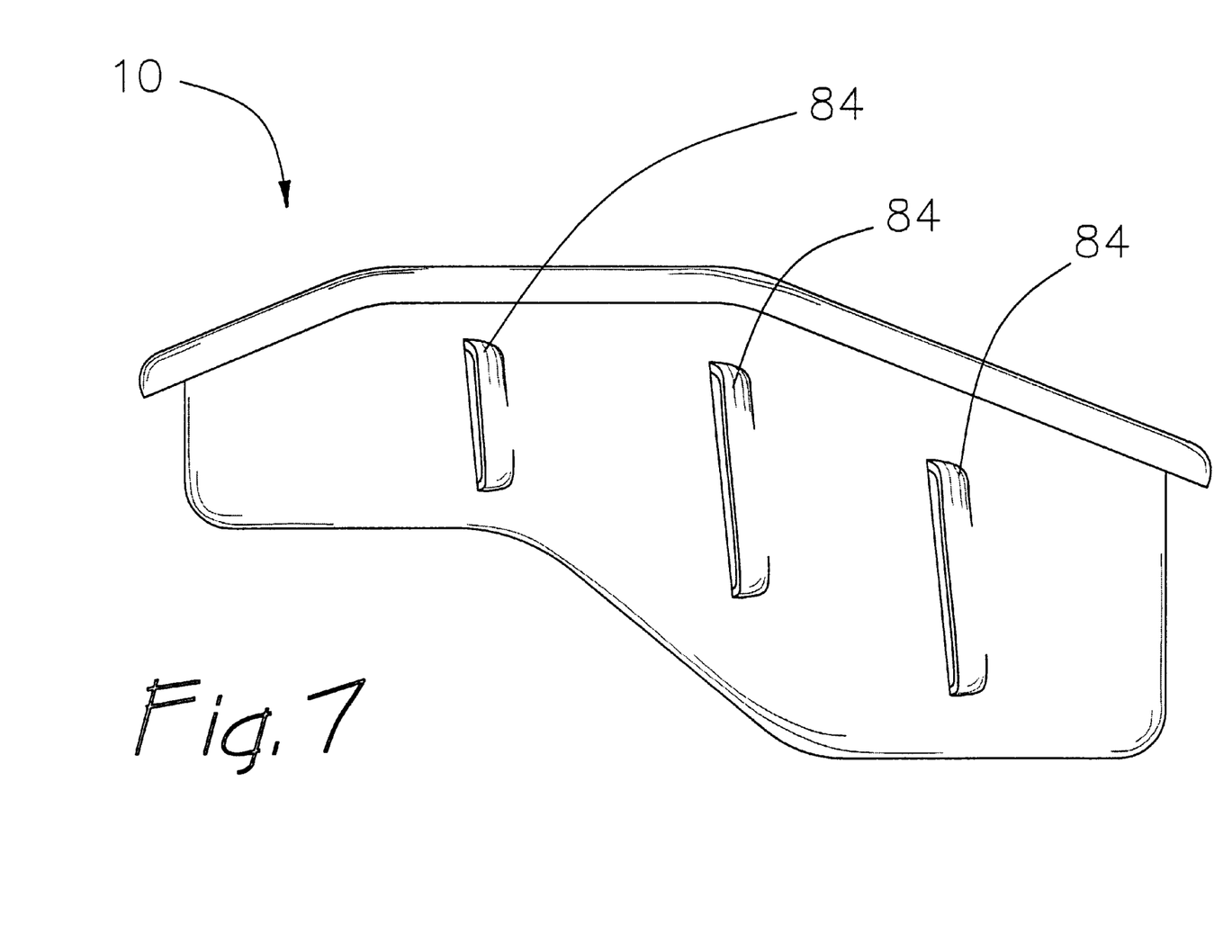
FIG. 7 illustrates an alternate embodiment of the pet carrier of the instant invention.

FIG. 7 illustrates an alternate preferred embodiment of the pet carrier 10 of the instant invention. As may be seen from this illustration, the pet carrier 10 includes forward embossed louvers 84 which significantly increase the airflow into and through the pet carrier 20 to enhance the cooling effect provided thereby. These louvers are preferably fixably embossed in a forward opening position, although moveable louvers may be substituted without departing from the scope of the instant invention. Additionally, while the preferred embodiment utilizes forward opening louvers, rearward opening louvers may also be utilized, although the cooling effect may not be as great.

As may be apparent to those skilled in the art, the pet carrier of the instant invention may be molded as a unitary structure, or may be fabricated from metal or other materials such as composites as one sees fit. Regardless of the particular material and manufacturing process utilized in the construction of a carrier 10 of the instant invention, lightweight and high strength are the properties desired to reduce weight on the bicycle and to increase the safety of the pet which will be occupying the carrier.

Figure 8:
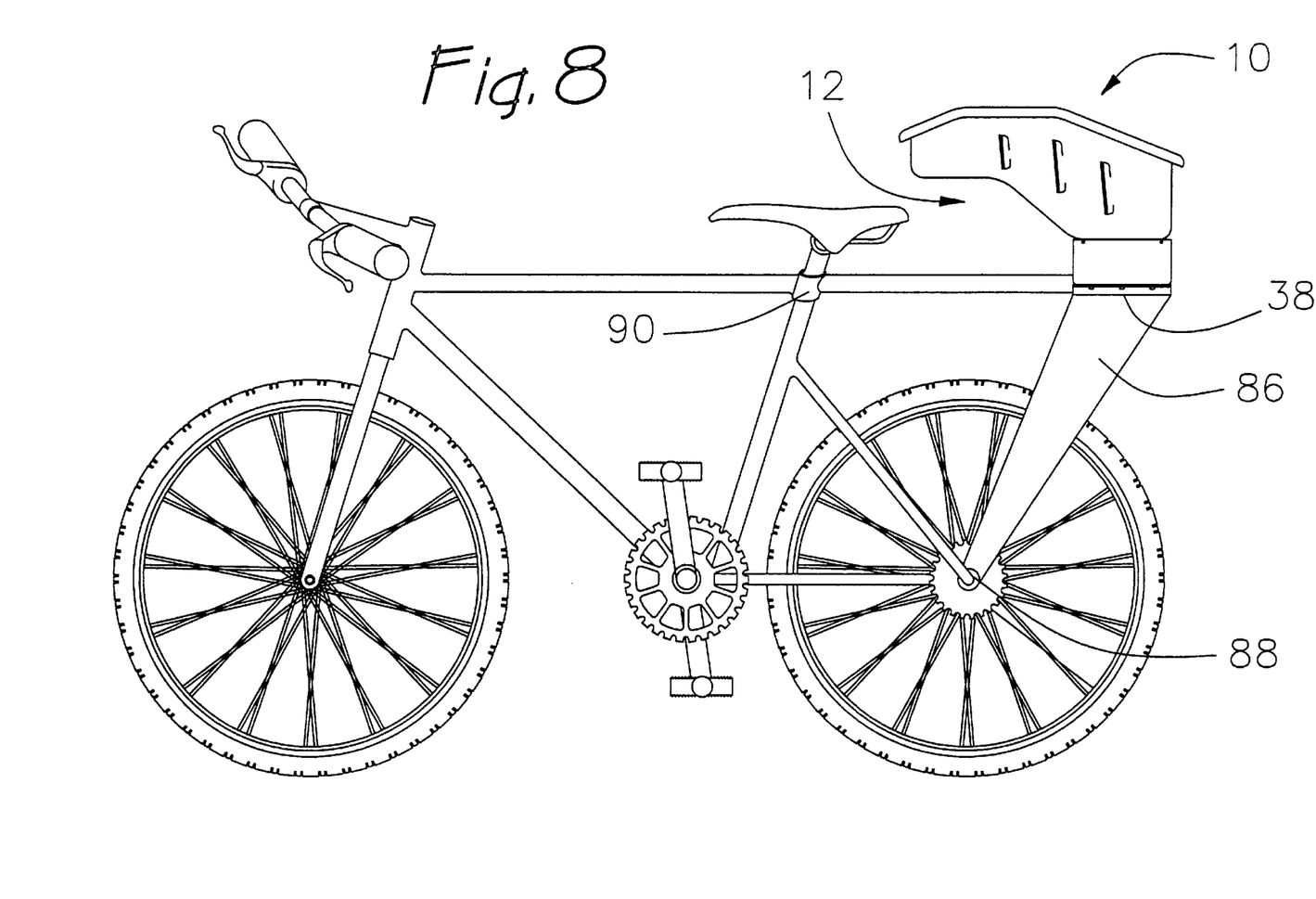
FIG. 8 illustrates an alternate installation of the pet carrier of the instant invention.

While the above described embodiments provide significant advantages over the rear mounted pet carriers, many of these advantages may still be realized in a rearward mounting position of the carrier 10 of the instant invention. Such an installation is illustrated in FIG. 8 to which specific reference is now made. As may be seen from this illustration, the advantages provided by the plateaued bottom surface 12 of the pet carrier 10 are still realized in a rear wheel mounted installation. The mounting adapter 86 utilized to maintain the pet carrier 10 in a proper position mounts to the axle 88 and the bicycle frame 90 for stability. As with the above embodiments, the mounting adapter 86 may be detachably mounted to the pet carrier 10 by the mounting flange 38, or it may be integrally formed therewith as desired.

While not specifically illustrated in the embodiments discussed above, each of the disclosed embodiments of the instant invention may include provision for restraining straps or harnesses to keep the pet within the carrier 10. Such provisions may include slits in the upper portion of the side walls to accommodate Velcro™ or buckle straps; snaps; rivets; bolts; eyelets; etc. However, the necessity for such straps or harnesses is lessened in the forward mounted installation as the pet is always under the owner's watchful eye and hand should the pet be inclined to make sudden moves. Additionally, while only one size carrier 10 has been illustrated in the above description, one skilled in the art will recognize that the carrier can be made in various sizes to accommodate pets of different sizes. A highly preferred embodiment of the instant invention utilizes a pet carrier 10 of size sufficient to hold a pet weighing up to approximately 12 to 15 pounds, while the rear mounted carrier is sized to contain a pet weighing up to 35 to 40 pounds. While larger pets may be accommodated in either installation, a rider's skill and the balance and control of the bicycle, as well as any obstruction provided by a larger pet in the forward mounted position must be assessed before utilizing the instant invention.

Figure 9A:
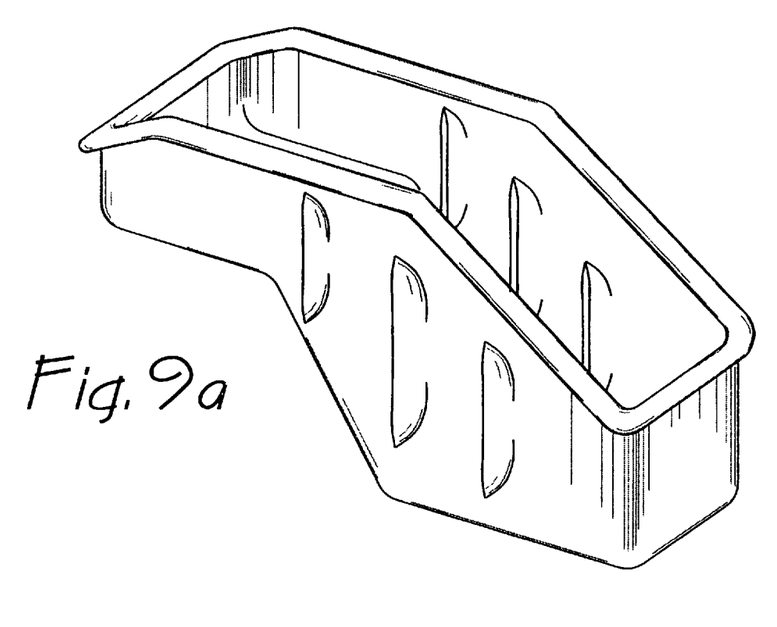
FIGS. 9a–g illustrate ornamental features of a preferred embodiment of the instant invention in isometric, right side, left side, top, bottom, back, and front views.
Figure 9B:
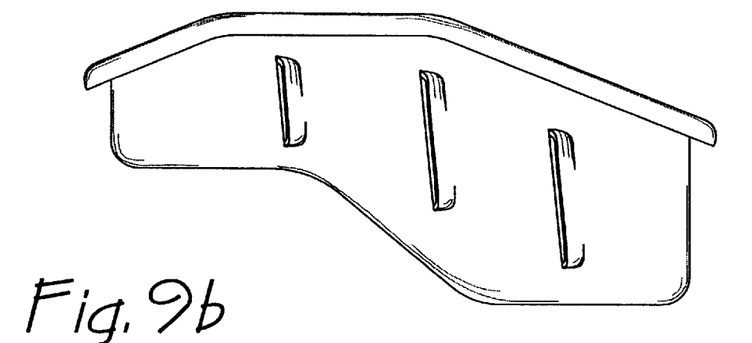
Figure 9C:
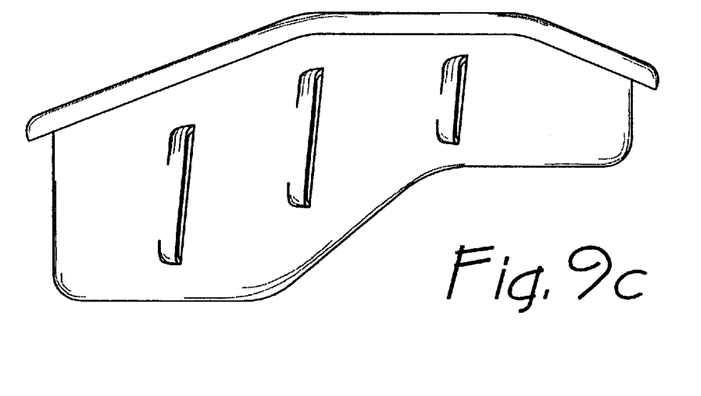
Figure 9D:
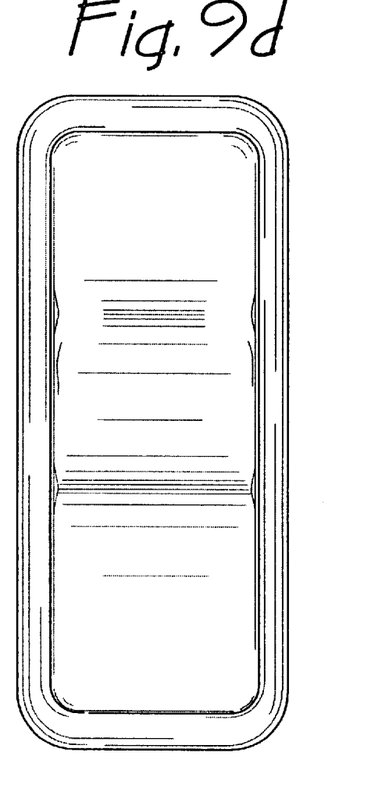
Figure 9E:
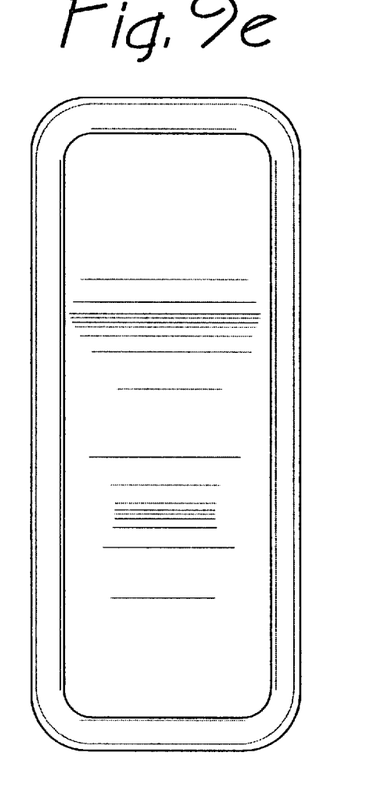
Figure 9F:
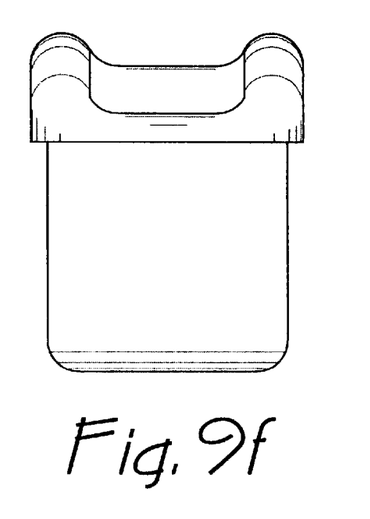
Figure 9G:
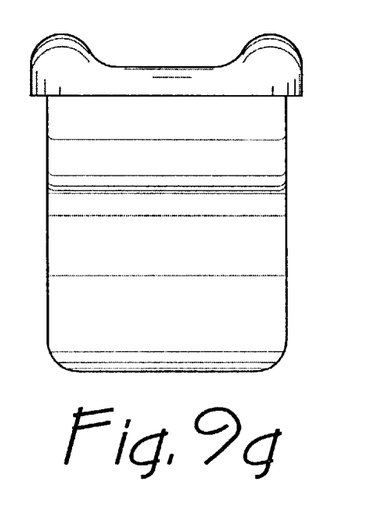

As may be apparent to one skilled in the art, a preferred embodiment of the pet carrier of the instant invention includes ornamental aspects to its design. These ornamental aspects may be more fully appreciated from an examination of FIGS. 9a–g. FIG. 9a illustrates the ornamental aspects of an embodiment of the instant invention in an isometric view, while FIGS. 9b–c illustrate the ornamental aspects from a left and a right side view. FIGS. 9d–e provide a view from the top and bottom, and FIGS. 9f–g provide a view from the back and the front to allow a fuller appreciation of these ornamental aspects.

Numerous modifications and alternative embodiments of the invention will be apparent to those skilled in the art in view of the foregoing description. Accordingly, this description is to be construed as illustrative only and is for the purpose of teaching those skilled in the art the best mode for carrying out the invention. Details of the structure and implementation of the various components described above can be varied substantially without departing from the spirit of the invention, and exclusive use of all modifications that come within the scope of the appended claims is reserved.

What is claimed is:

1. A pet carrier for use on a bicycle, comprising a structure having a plateaued bottom surface and vertical front, side, and rear walls, said plateaued bottom surface defining a raised forward resting surface, an intermediate sloped surface, a lower rearward support surface, and wherein said side walls define air passages therethrough.

2. The carrier of claim 1, wherein said air passages are configured to form forward embossed louvers.

3. A pet carrier for use on a bicycle, comprising a structure having a plateaued bottom surface and vertical front, side, and rear walls, said plateaued bottom surface defining a raised forward resting surface, an intermediate sloped surface, a lower rearward support surface and a mounting adapter operably coupled to said support surface and configured to mount on a center bar of a bicycle.

4. The pet carrier of claim 3, wherein said support surface includes a mounting flange on an exterior thereof, and wherein said mounting adapter is removably attached thereto to provide said operable coupling.

5. The pet carrier of claim 3, wherein said mounting adapter includes a bracket portion, and a base portion having a lower surface and an upper mounting surface, said base portion defining a mounting groove in a lower surface thereof adapted to accommodate a center bar of a bicycle, said mounting groove being positioned in a spaced parallel relationship to said upper mounting surface, said bracket portion being operably coupled to said lower surface to securely attach said mounting adapter to the center bar of a man's bicycle.

6. The pet carrier of claim 3, wherein said mounting adapter includes a bracket portion, and a base portion having a lower surface and an upper mounting surface, said base portion defining a mounting groove in a lower surface thereof adapted to accommodate a center bar of a bicycle, said mounting groove being positioned in a spaced angled relationship to said upper mounting surface, said bracket portion being operably coupled to said lower surface to securely attach said mounting adapter to the center bar of a woman's bicycle.

7. The pet carrier of claim 3, wherein said mounting adapter includes a bracket portion, and an adjustable base portion having a lower portion defining a lower surface and an upper portion pivotably attached to said lower portion at a forward position and defining an upper mounting surface, said lower portion defining a mounting groove in said lower surface thereof adapted to accommodate a center bar of a bicycle, said mounting groove being positioned in a spaced, adjustable angle relationship to said upper mounting surface, said bracket portion being operably coupled to said lower surface to securely attach said mounting adapter to the center bar of a bicycle, and said upper portion being adjustable to provide said upper mounting surface at an essentially horizontal position regardless of an angular relationship of the center bar of the bicycle.

8. A pet carrier for use on a bicycle, comprising a structure having a plateaued bottom surface and vertical front, side, and rear walls, said plateaued bottom surface defining a raised forward resting surface, an intermediate sloped surface, a lower rearward support surface, and a mounting adapter operably coupled to said support surface and configured to mount to a rear wheel axle and frame of the bicycle to position said pet carrier behind a rider.

9. A pet carrier for use on a bicycle having a seat, handlebars, and a center bar provided between the seat and the handlebars, comprising:
 a structure having a plateaued bottom surface defining a raised forward resting surface, an intermediate sloped surface, and a lower rearward support surface; and
 a mounting adapter operably coupled to said lower rearward support surface, said mounting adapter being adapted to securely mount on the center bar of the bicycle forward of the seat; and
 wherein said plateaued bottom surface is adapted to position said forward resting surface vertically above the handlebars without interference therewith when mounted by said mounting adapter on the center bar of the bicycle forward of the seat.

10. The pet carrier of claim 9, wherein said structure further comprises essentially vertical front, side, and rear walls, said front wall defining a reduced height portion adapted to accommodate a pet's head.

11. The pet carrier of claim 10, wherein said reduced height portion includes a chin pad on an upper surface thereof.

12. The pet carrier of claim 10, wherein said side walls define forward embossed louvers therein.

13. The pet carrier of claim 9, wherein said mounting adapter includes a bracket portion, and an adjustable base portion having a lower portion defining a lower surface and an upper portion pivotably attached to said lower portion at a forward position and defining an upper mounting surface, said lower portion defining a mounting groove in said lower surface thereof adapted to accommodate a center bar of a bicycle, said mounting groove being positioned in a spaced, adjustable angle relationship to said upper mounting surface, said bracket portion being operably coupled to said lower surface to securely attach said mounting adapter to the center bar of the bicycle, and said upper portion being adjustable to provide said upper mounting surface at an essentially horizontal position regardless of an angular relationship of the center bar of the bicycle.

14. A pet carrier, comprising:
 a bicycle having a seat, handlebars, and a center bar provided between the seat and the handlebars; and
 a pet containment structure having a plateaued bottom surface defining a lower rearward support surface mounted to said center bar forward of said seat, a forward projecting intermediate upwardly sloped surface joined to said rearward support surface, and a raised forward resting surface joined to said intermediate upwardly sloped surface and positioned vertically above said handlebars in a non-interfering relationship thereto.

15. The pet carrier of claim 14, further comprising a mounting adapter interposed between and operably coupled to said lower rearward support surface and said center bar, said mounting adapter being adapted to securely mount on the center bar of the bicycle forward of the seat to provide an essentially horizontal positioning of said lower rearward support surface.

16. The pet carrier of claim 15, wherein said mounting adapter includes a bracket portion, and an adjustable base portion having a lower portion defining a lower surface and an upper portion pivotably attached to said lower portion at a forward position and defining an upper mounting surface, said lower portion defining a mounting groove in said lower surface thereof adapted to accommodate said center bar, said mounting groove being positioned in a spaced, adjustable-angle relationship to said upper mounting surface, said bracket portion being operably coupled to said lower surface to securely attach said mounting adapter to said center bar, and said upper portion being adjustable to provide said upper mounting surface at an essentially horizontal position for center bar configurations of both men's and women's bicycles.

* * * * *